(12) United States Patent
Kihlander

(10) Patent No.: US 12,142,823 B2
(45) Date of Patent: Nov. 12, 2024

(54) PIVOTABLE CONNECTION DEVICE AND A VEHICLE

(71) Applicant: SAAB AB, Linköping (SE)

(72) Inventor: Anders Kihlander, Granbergsdal (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 18/700,003

(22) PCT Filed: Oct. 4, 2022

(86) PCT No.: PCT/SE2022/050886
§ 371 (c)(1),
(2) Date: Apr. 10, 2024

(87) PCT Pub. No.: WO2023/068981
PCT Pub. Date: Apr. 27, 2023

(65) Prior Publication Data
US 2024/0332786 A1    Oct. 3, 2024

(30) Foreign Application Priority Data
Oct. 18, 2021 (SE) .................................. 2100153-2

(51) Int. Cl.
H01Q 1/12 (2006.01)
H01Q 1/08 (2006.01)
H01Q 1/32 (2006.01)

(52) U.S. Cl.
CPC ............... *H01Q 1/32* (2013.01); *H01Q 1/084* (2013.01); *H01Q 1/1235* (2013.01)

(58) Field of Classification Search
CPC ............ H01Q 1/08; H01Q 1/084; H01Q 1/12; H01Q 1/1235; H01Q 1/32
See application file for complete search history.

(56) References Cited

U.S. PATENT DOCUMENTS 4,243,989 A    1/1981  Pepper
4,931,809 A *  6/1990  Putman ................ H01Q 1/3275
                                                343/882

(Continued)

FOREIGN PATENT DOCUMENTS

EP    0589450 A1    3/1994
GB    751542 A      6/1956

(Continued)

OTHER PUBLICATIONS

International Search Report and Written Opinion for Patent Cooperation Treaty Application No. PCT/SE2022/050886, dated Oct. 27, 2022, 14 pages.

*Primary Examiner* — Tho G Phan
(74) *Attorney, Agent, or Firm* — Alston & Bird LLP

(57) ABSTRACT

The disclosure relates to a pivotable connection device (100) comprises a first and a second bracket (101, 102), a locking member (103), a spring (105), and an abutment member (104). The first and the second bracket (101, 102) are pivotable connected to each other, and the spring (105) is located between the locking member (103) and the abutment member (104). In a first mode of operation (M1), the locking member (103) is displaced towards the abutment member (104) such that the spring (105) is compressed, and such that the first and second bracket (101, 102) are pivotable in relation to each other. In a second mode of operation (M2), the locking member (103) is displaced towards the first bracket (101) by the spring (105), such that the locking member (103) overlaps the first and the second bracket (101, 102) and prevents pivoting. The disclosure further relates to a vehicle (200).

11 Claims, 3 Drawing Sheets

(56) References Cited

U.S. PATENT DOCUMENTS

| | | | | |
|---|---|---|---|---|
| 6,791,501 B2 * | 9/2004 | Maeda | ............... | H01Q 1/1214 |
| | | | | 343/900 |
| 8,102,322 B2 * | 1/2012 | Khreizat | ............... | H01Q 1/325 |
| | | | | 343/715 |
| 8,441,401 B2 * | 5/2013 | Steinkamp | ........... | H01Q 1/1214 |
| | | | | 343/715 |

FOREIGN PATENT DOCUMENTS

| GB | 1527012 A | 10/1978 |
|---|---|---|
| JP | S 60212003 A | 10/1985 |
| WO | WO 2011/004636 A1 | 1/2011 |

* cited by examiner

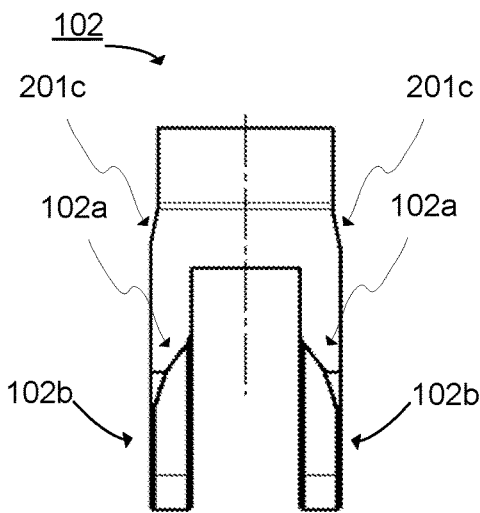
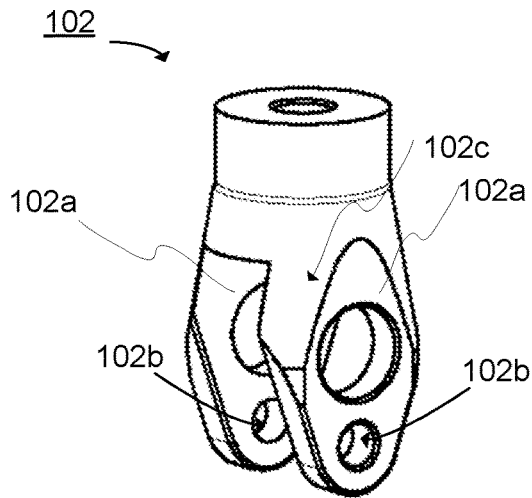
Fig.2a　　　　　　　　Fig.2b
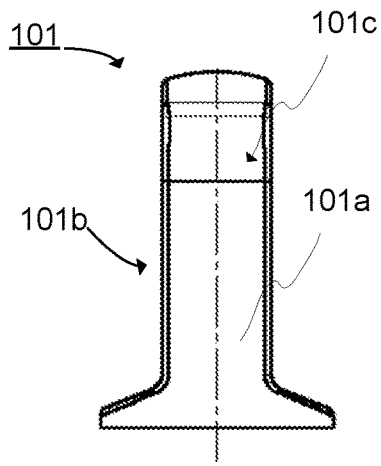
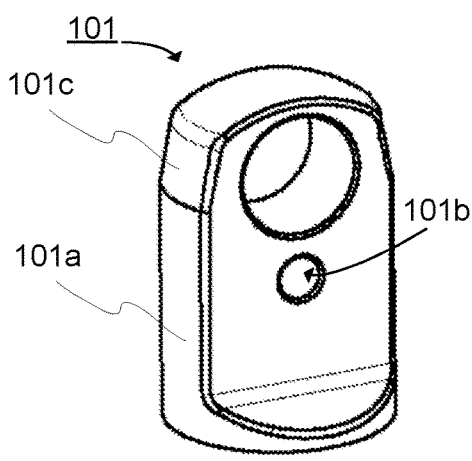
Fig.2c　　　　　　　　Fig.2d
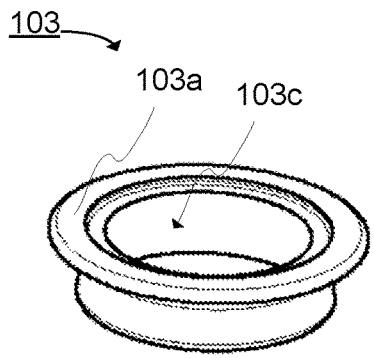
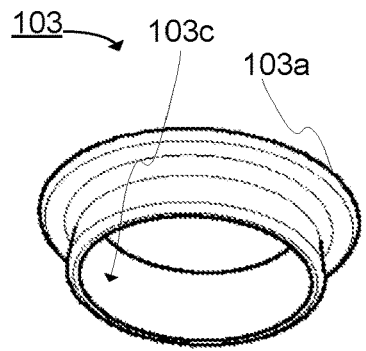
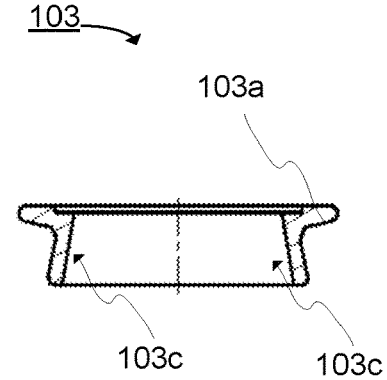
Fig.2e　　　Fig.2f　　　Fig.2g

PIVOTABLE CONNECTION DEVICE AND A VEHICLE

CROSS REFERENCE TO RELATED APPLICATIONS

This application is a National Stage Application, filed under 35 U.S.C. § 371, of International Application No. PCT/SE2022/050886, filed Oct. 4, 2022, which international application claims priority to and the benefit of Swedish Application No. 2100153-2, filed Oct. 18, 2021; the contents of both of which are hereby incorporated by reference in their entirety.

TECHNICAL FIELD

The present disclosure relates to a pivotable connection device and a vehicle. More specifically, the disclosure relates to a pivotable connection device and a vehicle as defined in the introductory parts of claim 1 and claim 9.

BACKGROUND ART

A problem with the solutions of the prior art is that they are not user friendly. For example, solutions of prior art is not suitable for certain harsh condition, e.g. cold weather wherein the user maneuvering the pivotable connection is wearing gloves. Another example indicating the problem of prior art is the lack of a smooth maneuvering procedure, which make it difficult for a user to pivot a protruding object connected to a pivotable connection without using unnecessarily amount of force, which is not desirable in certain situations. There is thus a need for improved pivotable connection.

SUMMARY

It is an object of the present disclosure to mitigate, alleviate or eliminate one or more of the above-identified deficiencies and disadvantages in the prior art and solve at least the above mentioned problem.

According to a first aspect there is provided a pivotable connection device, for protruding objects which comprises a first bracket and a second bracket, and an locking member, which encloses an outer periphery of the second bracket and is displaceable in a first direction along the outer periphery of the second bracket, a spring, and an abutment member attached to and projecting from the outer periphery of the second bracket, and forming a first abutment surface against which the spring abuts, wherein the first bracket and the second bracket are pivotable connected to each other, and wherein the spring is located between the locking member and the abutment member, and wherein, in a first mode of operation, the locking member is displaced towards the abutment member such that the spring is compressed, and such that the first bracket and a second bracket are pivotable in relation to each other, and, wherein, in a second mode of operation, the locking member is displaced towards the first bracket by the action of the spring, such that the locking member overlaps both the first bracket and the second bracket and prevents pivoting of the first bracket in relation to the second bracket. This has the advantage of a smooth pivotable connection which is easy to maneuver by a user.

According to some embodiments, the locking member comprises a ring having an inner diameter corresponding to the outer diameter of the first and second brackets in the region of the first bracket and the second bracket where the locking member is displaceable between the first mode of operation and the second mode of operation.

According to some embodiments, one of the first bracket and the second bracket comprises one arm, and the other of the first bracket and the second bracket comprises two arms, wherein each of the arms comprises a through hole, and wherein said through holes are in alignment with each other and wherein the connection comprises a pin extending through said through holes.

According to some embodiments, the locking member comprises a protruding edge configured to enable a user of gripping the protruding edge and displacing the locking member from the second mode of operation to the first mode of operation.

According to some embodiments, the spring is a coil spring.

According to some embodiments, pivotable connection device comprises a second abutment surface provided on an opposite side of the spring in relation to the abutment member, and configured to prevent the locking member from being displaced beyond the first mode of operation in a direction away from said abutment member.

According to some embodiments, the second abutment surface is an increasing outer peripheral measure on at least of the first bracket and the second bracket increasing in the direction away from the abutment member. In other words, at least of the first bracket and the second bracket is having a conical shape. This is advantageously since the locking member will connect to the second abutment surface in a smooth way. In other words, the locking member will gradually attach around the first and second brackets during the transition from the first mode of operation (i.e. the pivotable mode) to the second mode of operation (i.e. the locked mode).

According to some embodiments, the locking member has an inner periphery measure which is increasing away from the abutment member. This is advantageously since the locking member will connect to the second abutment surface in a smooth and seamless operation, similar to the embodiment mention above.

If combining the two latter embodiments, i.e. the second abutment surface being an increasing outer peripheral measure on the first bracket and/or the second bracket increasing in the direction away from the abutment member, and wherein the locking member has an inner periphery measure which is increasing away from the abutment member. The transition back and forth the two modes of operation will be particularly smooth and seamless, both with respect to the pivoting of a protruding object as well the locking and unlocking procedures.

According to a second aspect there is provided a vehicle comprising a vehicle body, a protruding object, a pivotable connection device, according to any of the first aspect. The first bracket is mounted on the vehicle body, and the second bracket is attached to the protruding object. In scenario when a vehicle has one of more protruding objects mounted on a vehicle it desirable to fold the protruding objects. It is especially advantageously if the pivot procedure is easy to maneuver, and that the pivot procedure is smooth.

According to some embodiments, the vehicle is a military vehicle.

According to some embodiments, the protruding object is an antenna.

Effects and features of the second aspect are to a large extent analogous to those described above in connection with the first aspect. Embodiments mentioned in relation to the first aspect are largely compatible with the second aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIGS. 2a-2g shows perspective views of the components of the pivotable connection according to an embodiment of the present disclosure.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1A:
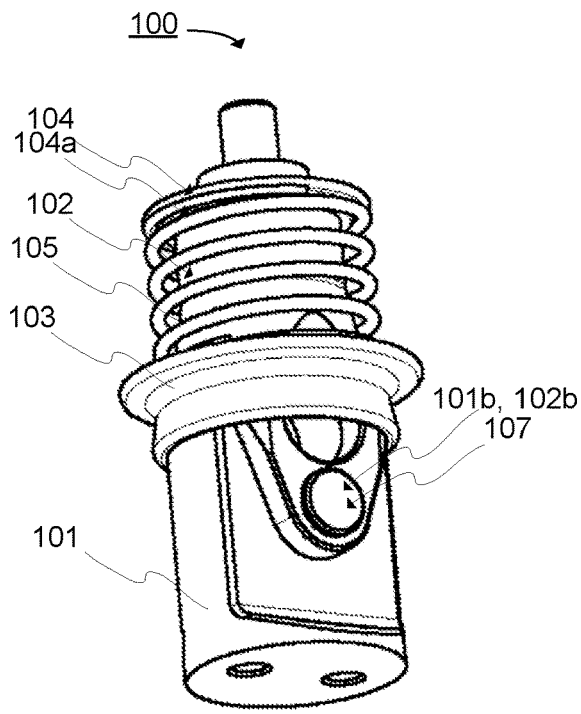
FIGS. 1a-1c shows a perspective, view of the pivotable connection according to an embodiment of the present disclosure.
Figure 1B:
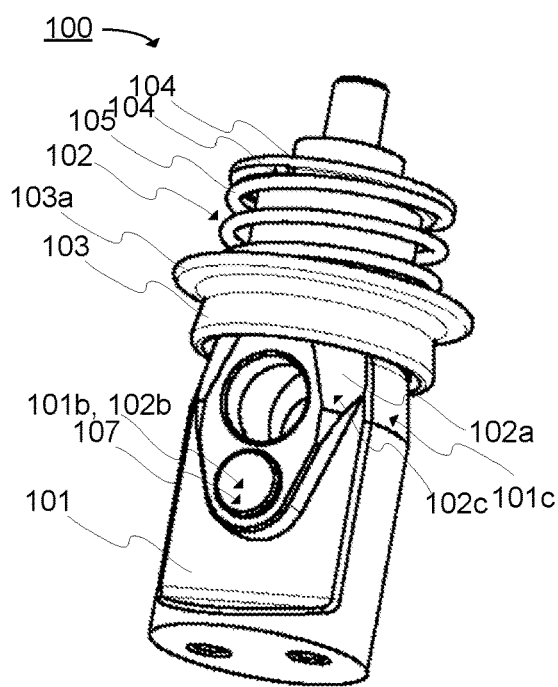
Figure 1C:
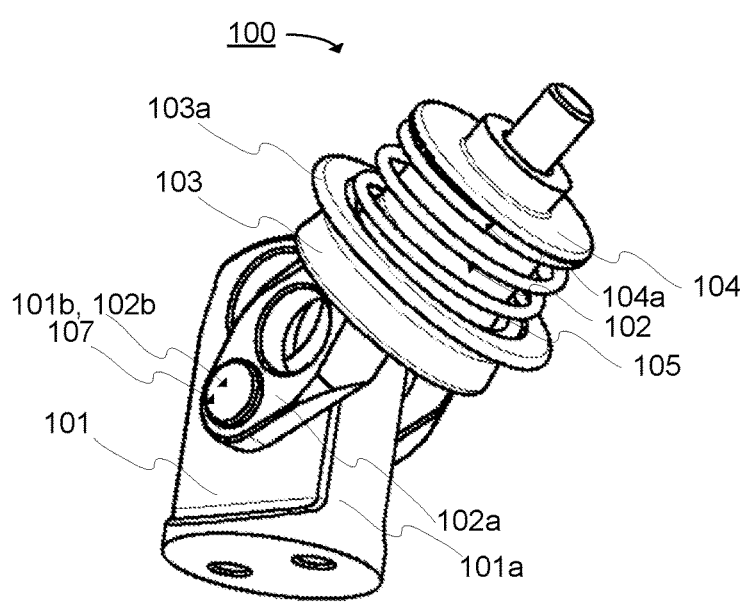

FIGS. 1a-1c illustrates a simplified architecture of the pivotable connection 100 according to an embodiment of the present disclosure. FIG. 1a show the pivotable connection 100 in a second mode of operation. FIG. 1b-1c show the pivotable connection 100 in a first mode of operation.

The first aspect of this disclosure shows a pivotable connection device 100, for protruding objects (Shown in FIG. 3 as 106) which comprises a first bracket 101 and a second bracket 102, a locking member 103, an abutment member 104, and a coil spring 105.

The locking member 103 encloses an outer periphery of the second bracket 102 and is displaceable in a first direction along the outer periphery of the second bracket 102. The abutment member 104 is attached to and projecting from the outer periphery of the second bracket 102, and forming a first abutment surface 104a against which the spring 105 abuts. The first bracket 101 and the second bracket 102 are pivotable connected to each other. The spring 105 is located between the locking member 103 and the abutment member 104. In a first mode of operation M1 (shown in FIG. 1b-1c), the locking member 103 is displaced towards the abutment member 104 such that the spring 105 is compressed, and such that the first bracket 101 and a second bracket 102 are pivotable in relation to each other (shown in FIG. 1c). In a second mode of operation M2 (shown in FIG. 1a), the locking member 103 is displaced towards the first bracket 101 by the action of the spring 105, such that the locking member 103 overlaps both the first bracket 101 and the second bracket 102 and prevents pivoting of the first bracket 101 in relation to the second bracket 102.

The locking member 103 comprises a ring having an inner diameter corresponding to the outer diameter of the first and second brackets 101,102 in the region of the first bracket 101 and the second bracket 102. The locking member 103 is displaceable between the first mode of operation and the second mode of operation.

The first bracket 101 comprises one arm 101a (further illustrated in FIG. 2c-2d), and the second bracket 102 comprises two arms 102a (further illustrated in FIG. 2a-2b), wherein each of the arms 101a, 102a comprises a through hole 101b, 102b. The through holes 101b, 102b are in alignment with each other and wherein the connection comprises a pin 107 extending through said through holes 101b, 102b.

The locking member 103 comprises a protruding edge 103a (further illustrated in FIG. 2e-2g) configured to enable a user of gripping the protruding edge 103a and displacing the locking member 103 from the second mode of operation M2 to the first mode of operation M1.

A second abutment surface 101c, 102c (not shown in FIGS. 1a and 1c) provided on an opposite side of the spring 105 in relation to the abutment member 104a, and configured to prevent the locking member 103 from being displaced beyond the first mode of operation in a direction away from said abutment member 104a.

The second abutment surface 101c, 102c is an increasing outer peripheral measure on both of the first bracket 101 and the second bracket 102 increasing in the direction away from the abutment member 104.

The locking member 103 has an inner periphery measure 103c (further illustrated in FIG. 2g) which is increasing away from the abutment member 104. FIG. 2a-2g illustrate components of the training device 200 of the first aspect as depicted in FIG. 1a-1c.

Figure 3:
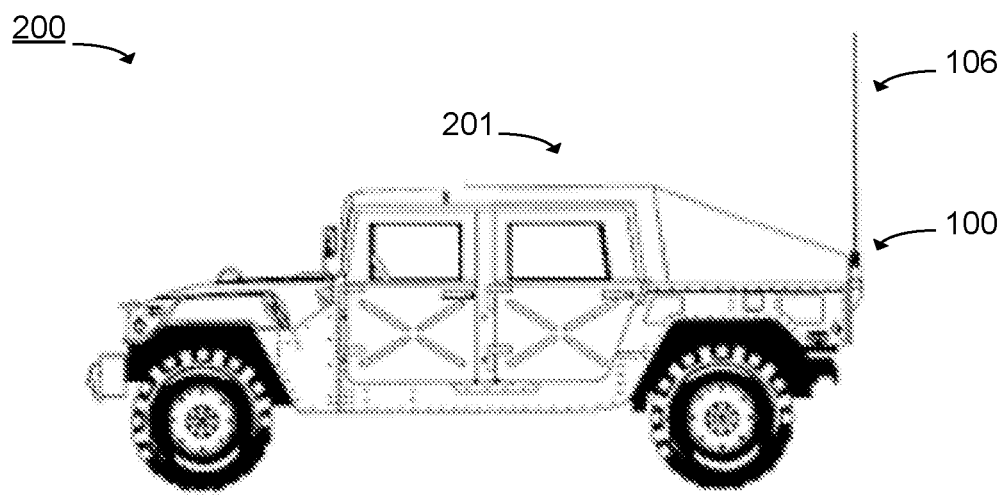
FIG. 3 shows a perspective, view of the pivotable connection according to an embodiment of the present disclosure.

FIG. 3 illustrates a simplified architecture of an example embodiment according to the second aspect of this disclosure. FIG. 3 show a vehicle 200 comprising a vehicle body 201, a protruding object 106, and a pivotable connection device 100 according to the first aspect.

The first bracket 101 is mounted on the vehicle body 201, and the second bracket 102 is attached to the protruding object 106.

The vehicle 200 is a military vehicle.

The protruding object 106 is an antenna.

The person skilled in the art realizes that the present disclosure is not limited to the preferred embodiments described above. The person skilled in the art further realizes that modifications and variations are possible within the scope of the appended claims. For example. Additionally, variations to the disclosed embodiments can be understood and effected by the skilled person in practicing the claimed disclosure, from a study of the drawings, the disclosure, and the appended claims.

The invention claimed is:

1. A pivotable connection device (100) for protruding objects (106), the device comprising:
    a first bracket (101) and a second bracket (102),
    a locking member (103), which encloses an outer periphery of the second bracket (102) and is displaceable in a first direction along said outer periphery of the second bracket (102),
    a spring (105), and
    an abutment member (104) attached to and projecting from said outer periphery of the second bracket (102), and forming a first abutment surface (104a) against which the spring (105) abuts,
    wherein:
        the first bracket (101) and the second bracket (102) are pivotable connected to each other,
        the spring (105) is located between the locking member (103) and the abutment member (104),
        in a first mode of operation (M1), the locking member (103) is displaced towards the abutment member (104) such that the spring (105) is compressed, and the first bracket (101) and the second bracket (102) are pivotable in relation to each other, and
        in a second mode of operation (M2), the locking member (103) is displaced towards the first bracket (101) by the action of the spring (105), such that the locking member (103) overlaps both the first bracket (101) and the second bracket (102) and prevents pivoting of the first bracket (101) in relation to the second bracket (102).

2. The pivotable connection device (100) according to claim 1, wherein the locking member (103) comprises a ring having an inner diameter corresponding to the outer diameter of the first and second brackets (101,102) in the region of the first bracket (101) and the second bracket (102) where the locking member (103) is displaceable between the first mode of operation and the second mode of operation.

3. The pivotable connection device (100) according to claim 1, wherein one of the first bracket (101) and the second bracket (102) comprises one arm (101a), and the other of the first bracket (101) and the second bracket (102) comprises two arms (102a), wherein each of the arms (101a,102a) comprises a through hole (101b,102b), and wherein said through holes (101b,102b) are in alignment with each other and wherein the connection comprises a pin (107) extending through said through holes (101b,102b).

4. The pivotable connection device (100) according to claim 1, wherein the locking member (103) comprises a protruding edge (103a) configured to enable a user of gripping the protruding edge and displacing the locking member from the second mode of operation to the first mode of operation.

5. The pivotable connection device (100) according to claim 1, wherein the spring (105) is a coil spring.

6. The pivotable connection device (100) according to claim 1, wherein the device further comprises a second abutment surface (101c, 102c) provided on an opposite side of the spring (105) in relation to the abutment member (104a), and configured to prevent the locking member (103) from being displaced beyond the first mode of operation in a direction away from said abutment member (104a).

7. The pivotable connection device (100) according to claim 6, wherein the second abutment surface (101c,102c) is an increasing outer peripheral measure on at least of the first bracket (101) and the second bracket (102) increasing in the direction away from the abutment member 104.

8. The pivotable connection device (100) according to claim 1, wherein the locking member (103) has an inner periphery measure (103c) which is increasing away from the abutment member (104).

9. A vehicle (200) comprising:
    a vehicle body (201),
    a protruding object (106), and
    a pivotable connection device (100), according to claim 1, wherein:
        the first bracket (101) is mounted on the vehicle body (201), and
        the second bracket (102) is attached to the protruding object (106).

10. The vehicle (200) according to claim 9, wherein the vehicle (200) is a military vehicle.

11. The vehicle (200) according to claim 9, wherein the protruding object (106) is an antenna.

* * * * *